April 3, 1928. 1,664,545

H. D. GEYER

ICE CREAM CABINET LID

Filed Dec. 15, 1926

Inventor
Harvey D. Geyer
By Spencer Hardman & Fehr
Attorney

Patented Apr. 3, 1928.

1,664,545

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

ICE-CREAM-CABINET LID.

Application filed December 15, 1926. Serial No. 154,910.

This invention relates to removable covers or lids, and particularly to lids for closing the openings in the top of ice cream cabinets provided to afford access to the ice cream containers therebelow.

An object of this invention is to provide an improved form of lid construction which is economical to manufacture and very efficient in use.

Further objects and advantages of the present invention will be apparent from the following description, reference being had to the accompanying drawings, wherein a preferred form of embodiment of the present invention is clearly shown.

Figure 1:
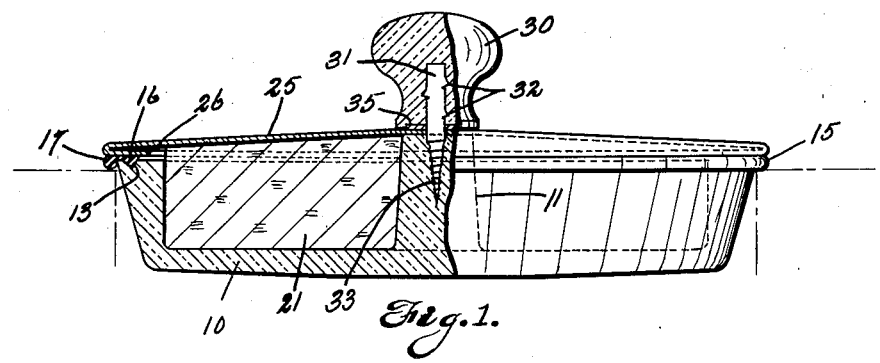
Fig. 1 is in part a side elevation and in part a vertical section through a lid for an ice cream cabinet made according to this invention.
Figure 2:
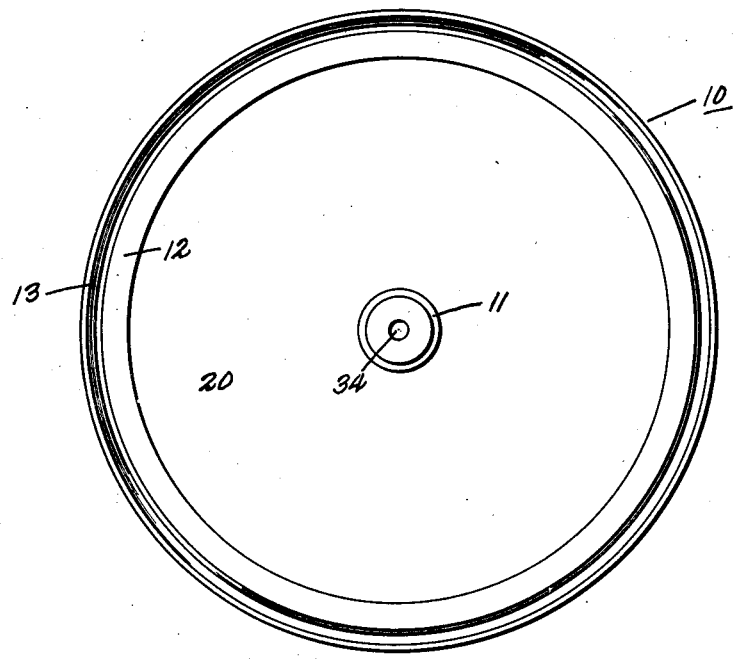
Fig. 2 is a detail view of the bottom molded member with the sealing gasket and heat insulating material removed therefrom.

Numeral 10 designates the bottom cup-shaped molded member having a central upstanding projection 11 integral therewith. The upper face 12 of this cupped member 10 has a peripheral groove 13 molded therein, preferably shaped as clearly shown in Fig. 1. An elastic rubber gasket 15, preferably molded in an endless loop, has an inner portion 16 which conforms to and seats within the groove 13, and an outer portion 17 which projects beyond the peripheral edge of member 10, all as clearly illustrated in Fig. 1. The central chamber 20 of member 10 is filled with suitable insulating material, such as the ground cork board 21 illustrated.

The top member 25 is made from quite heavy sheet metal, preferably Monel metal, is convexed upwardly, and has its peripheral edge 26 bent back under in order to provide a smooth edge and to materially stiffen the periphery of the top.

The hand knob 30 is preferably molded from the same material as the bottom member 10 and is provided with a metal insert 31 molded in place therein. Insert 31 has irregularities 32 thereon which render it more rigidly fixed against turning. The lower projecting end 33 of insert 31 is provided with a tapered screw-thread similar to wood screws. The central projection 11 has a hole 34 drilled therein into which the threaded end 33 is inserted for assembling the parts together. The metal screw threads of the end 33 cut their own way in the molded material of projection 11 when the hand knob 30 is screwed down by hand. Preferably a metal lock washer 35 is interposed between the top member 25 and the bottom face of knob 30 to avoid any possibility of the parts working loose.

The convexity of the metal top member 25 is such that when said top is set down upon the elastic rubber gasket 16 during assembly, the central portion of top 25 will be spaced from the top surface of projection 11 by a considerable distance. Now when this central portion is drawn down into contact with the projection 11 by the hand knob 30 and its threaded shank 33, the peripheral edges of top 25 will be very tightly clamped down upon the gasket 16 by the spring of the sheet metal top 25 since the convexity thereof has been reduced by the clamping down of the central portion thereof. It is obvious therefore that all the parts will be very firmly secured together by the single central attaching means.

The molded material of which members 10 and 30 are made may be any suitable and well known hard rubber composition or asphalt and mineral rubber compositions since the lid is not subjected to high temperatures in use. However there is preferably used a cold molding composition such as described and claimed in applicant's copending application, Serial No. 169,669, filed Feb. 9, 1927.

While the form of embodiment of the present invention as herein disclosed, constitutes a preferred form, it is to be understood that other forms might be adopted, all coming within the scope of the claims which follow.

What is claimed is as follows:

1. A removable lid for an opening in the top of an ice cream cabinet and adapted to seat by gravity upon said top, comprising: a molded composition cupped bottom member having a central upward projection integral therewith, a peripheral groove in its upper face, a sealing gasket in said groove, an upwardly convex sheet metal top member, means for clamping the central portion of said top member down upon said central projection and thereby also clamping the peripheral edges of said top member down upon said gasket by the spring of the sheet metal.

2. A heat insulating lid adapted to seat by gravity upon an opening in the top of an ice cream cabinet, comprising: a thick annular wall, a thick bottom plate, and a central spacer all integrally molded from a bituminous composition to form a relatively heavy lid body member, heat insulating material filling the interior chamber of said molded body member, a sheet metal cover plate resting upon the upper surface of said annular wall and central spacer, and a hand knob having a screw threaded metal shank extending through a central aperture in said top plate and down into said spacer thereby rigidly clamping said top plate down upon said annular wall and central spacer.

3. A heat insulating lid adapted to seat by gravity upon an opening in the top of an ice cream cabinet, comprising: a thick annular wall, a thick bottom plate, and a central spacer all integrally molded from a bituminous composition to form a relative heavy lid body member, heat insulating material filling the interior chamber of said molded body member, an upwardly convex sheet metal cover plate, and means for clamping the central portion of said cover plate down upon said central spacer.

In testimony whereof I hereto affix my signature.

HARVEY D. GEYER.